United States Patent [19]
Magara et al.

[11] Patent Number: 5,418,344
[45] Date of Patent: May 23, 1995

[54] METHOD AND APPARATUS FOR WIRE-CUTTING ELECTRICAL DISCHARGE MACHINING OF A CORNER

[75] Inventors: Takuji Magara; Hisahi Yamada, both of Aichi, Japan

[73] Assignee: Mitsubishi Denki Kabushiki Kaisha, Tokyo, Japan

[21] Appl. No.: 134,902

[22] Filed: Oct. 13, 1993

[30] Foreign Application Priority Data

Oct. 20, 1992 [JP] Japan .................................. 4-281346
Jun. 30, 1993 [JP] Japan .................................. 5-162724

[51] Int. Cl.⁶ .............................................. B23H 7/06
[52] U.S. Cl. ................................ 219/69.12; 219/69.17
[58] Field of Search ............ 219/69.12, 69.17, 69.13, 219/69.16; 364/474.04

[56] References Cited

U.S. PATENT DOCUMENTS

| | | | |
|---|---|---|---|
| 4,081,652 | 3/1978 | Jänicke et al. | 219/69.12 |
| 4,837,415 | 6/1989 | Magara et al. | 219/69.12 |
| 5,021,622 | 6/1991 | Magara et al. | 219/69.12 |
| 5,041,984 | 8/1991 | Watanabe | 219/69.17 |
| 5,113,050 | 5/1992 | Seki et al. | 219/69.12 |

FOREIGN PATENT DOCUMENTS

| | | | |
|---|---|---|---|
| 53-136797 | 11/1978 | Japan | 219/69.12 |
| 58-90426 | 5/1983 | Japan | 219/69.17 |
| 58-217228 | 12/1983 | Japan | 219/69.17 |
| 63-105828 | 5/1988 | Japan . | |
| 63-207520 | 8/1988 | Japan . | |
| 326419 | 2/1991 | Japan . | |
| 4-176516 | 6/1992 | Japan | 219/69.17 |
| 2180541 | 7/1993 | Japan . | |

*Primary Examiner*—Geoffrey S. Evans
*Attorney, Agent, or Firm*—Sughrue, Mion, Zinn, Macpeak & Seas; Richard C. Turner; Marc Kaufman

[57] ABSTRACT

A wire cut electrical discharge machining apparatus or machining a corner in a workpiece, which uses a gap error voltage to generate a command velocity component. A velocity control device is used for clamping a command velocity at not more than a set velocity value. Alternatively, the error voltage is used to generate the combination of an integration component and a transient response component which is used to generate a command velocity. Also, an inside corner with a small minimum corner radius can be machined at high accuracy by defining a plurality machining tracks, which include a circular portion at an inside corner, to have the same radius.

21 Claims, 10 Drawing Sheets

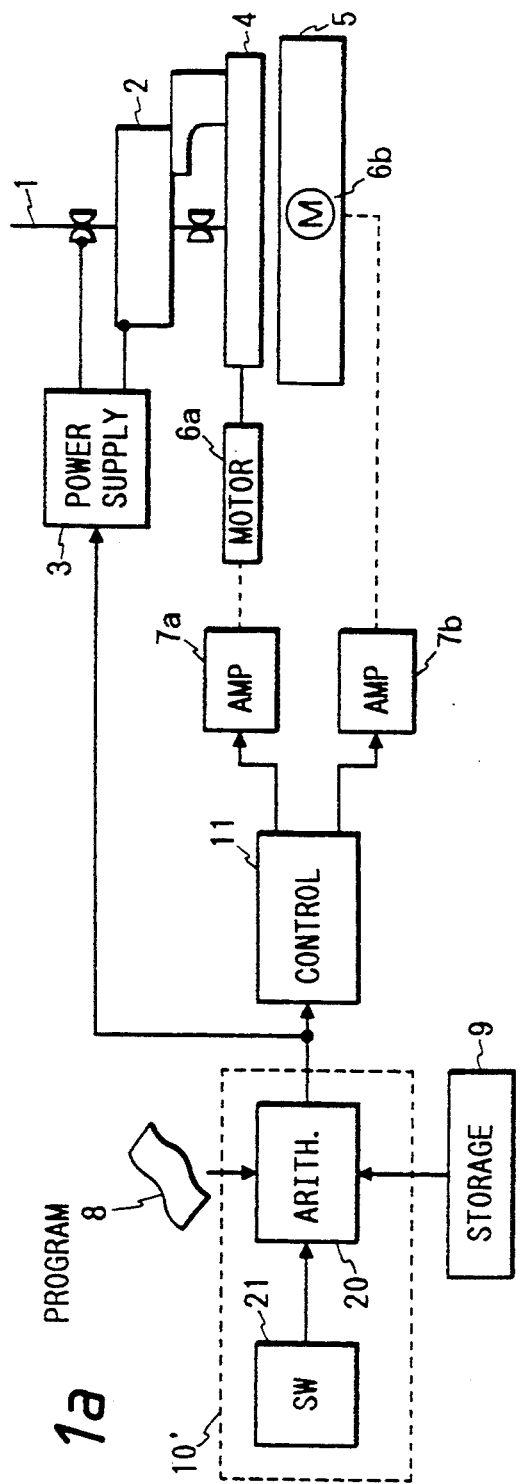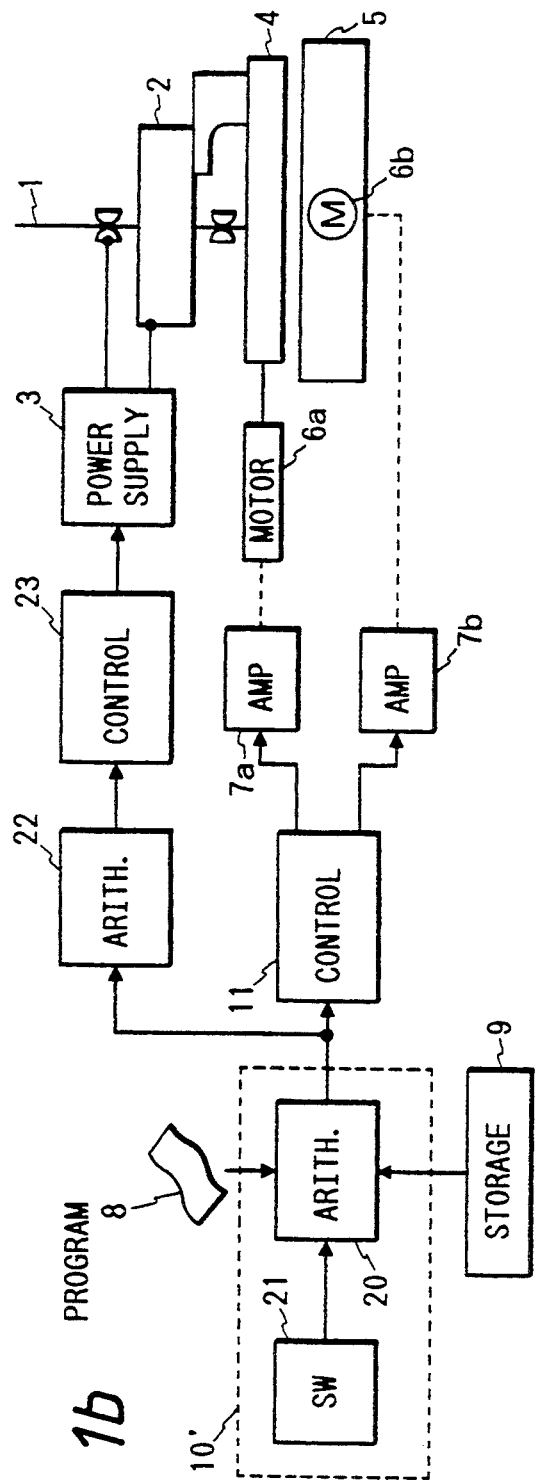
FIG. 1a
FIG. 1b

METHOD AND APPARATUS FOR WIRE-CUTTING ELECTRICAL DISCHARGE MACHINING OF A CORNER

BACKGROUND OF THE INVENTION

1. Field of the Invention

The present invention relates to a wirecut electrical discharge machine and method therefor which are operative to relatively move a wire electrode and a workpiece opposed to each other with the application of a voltage between the wire electrode and the workpiece to machine the workpiece. More particularly the invention concerns a wirecut electrical discharge machine and method therefor which are effective to improve the accuracy of inside corner machining operations during wirecut electrical discharge machining.

2. Description of the Background Art

FIG. 6a shows a conventional electrical discharge machine. In this drawing, a wire electrode 1 is connected to a machining power supply 3 and a workpiece 2 is mounted for movement by an X-table 4, which moves the workpiece 2 in an X direction, and a Y-table 5, which moves the workpiece 2 in a Y direction. Motors 6a and 6b are operative to move the X and Y tables respectively, while servo amplifiers 7a and 7b drive the motors 6a, 6b respectively. In operation, an NC program 8 and a storage device 9 which stores offset data are input to an NC unit 10, which has an arithmetic unit (not shown) to calculate machining tracks on the basis of the NC program and the offset data. A control apparatus 11 controls actual axis movements according to the machining tracks calculated by the NC unit 10.

In a conventional example, the wire electrode 1 is run by a wire electrode running device (not shown) and a pulse current is supplied between the wire electrode 1 and the workpiece 2 by the machining power supply 3 to machine the workpiece 2. The NC unit 10 calculates the machining tracks on the basis of the NC program and the offset data provided beforehand from memory or an NC tape. According to the results of the calculation of the machining tracks, the control apparatus 11 outputs move commands to the X and Y moving servo amplifiers 7a, 7b to drive the motors 6a, 6b, whereby the wire electrode 1 and the workpiece 2 are moved relatively on a two-dimensional basis to machine the workpiece 2.

The proper selection of operating voltage levels is a well known requirement for achieving high quality machining. FIG. 6b shows further details of the conventional wire electrical discharge machine. In this drawing, the components seen in FIG. 6a have the same reference number. A machining gap detection circuit 12 is used to detect an average machining gap voltage during machining. The wire 1 is supplied from a wire bobbin 10 past a tension application mechanism 17 and into the gap formed in workpiece 2. The wire then is passed through a wire runner 11 and is collected in a wire collection vessel 16. At the gap, the wire 1 is passed through dielectric nozzles 13a and 13b.

FIG. 6c shows velocity control program that is provided to the NC apparatus 10. Initially, the average voltage is detected at step 20 and then the arithmetic unit in the NC unit 10 will calculate an error between a set voltage and an average machining gap voltage per predetermined sampling time at step 21. At processing step 22, the arithmetic unit in NC unit 10 will calculate a command velocity per predetermined sampling from the error voltage found in step 21.

In operation, a velocity signal from the NC apparatus 11 causes the servo amplifier 7 to drive the servo motor 6, whereby the tables 4, 5 are moved in order to move the workpiece 2 in accordance with a desired sequence. The moving velocity during machining is changed according to the state of the machining gap. That is, the moving velocity is increased when the machining gap is wide and is decreased when it is narrow. Using this technique, the wire electrode 1 is prevented from making contact with the workpiece 2 and optimum machining is achieved. Since the gap distance during machining can be judged according to the average voltage during machining, the moving velocity is generally controlled so that the average machining gap voltage matches a predetermined set value.

Namely, as shown in FIG. 6c, the average voltage is detected at step S20. Then, a difference between a set voltage Vs that has been predetermined by the arithmetic unit and the average machining gap voltage V detected by the machining gap detection circuit 5 (hereinafter referred to as error voltage Ve) is first calculated at step S21. The arithmetic unit in the NC unit 10 then calculates a velocity component change value DF(n) defined as the function of the error voltage Ve. DF(n) is found from the product of conversion parameter K, which converts a voltage value into a velocity value, and error voltage Ve(n). Then, updated command velocity F(n) obtained as the result of adding the velocity component change value DF(n) to a previously calculated value F(n−1) is calculated. This command velocity signal is transmitted to the servo amplifier 7 to drive the servo motor 6, whereby the table 4 and the workpiece 2 are moved at a desired command velocity. Such arithmetic operations are repeated per predetermined sampling time. Accordingly, control is carried out so that the moving velocity of the workpiece may change according to the machining gap state, and machining progresses.

This type of velocity control is specific to wire electrical discharge machining wherein the control system is designed to avoid abrupt changes in velocity. Since the wire electrode is not rigid, a sharp change in velocity will cause oscillation which repeats the closure and opening of the machining gap, resulting in an inability to properly machine the workpiece.

Finishing at a corner in view of these conditions will now be considered. FIG. 7a shows changes in removal in the finishing of an inside corner, wherein A indicates a straight movement interval, B denotes a removal increase interval in which the removal increases before the corner, C represents an arc movement interval, D designates a removal decrease interval in which removal decreases before the end of the arc movement, and E indicates a straight movement interval after the corner. $O_1$ to $O_4$ indicate wire center positions in a corner finishing process, with $O_1$ representing the wire center position at the starting point of the removal increase interval, $O_B$ denoting the wire center position at any point in the removal increase interval B, $O_2$ designating the wire center position at the starting point of arc movement C, $O_3$ indicating the wire center position at the starting point of the removal decrease interval D, $O_D$ denoting the wire center position at any point within the removal decrease interval D, and $O_4$ indicating the wire center position at the end point of arc movement. $L_1$ to $L_4$ represent removal at corresponding wire center positions $O_1$ to $O_4$, with $L_1$ designating the removal when the wire center is at the position of $O_1$, $L_B$ designating the removal when the wire center is at the position of $O_B$, $L_2$ designating the removal when the wire center is at the position of $O_2$, $L_3$ designating the removal when the wire center is at the position of $O_3$, $L_D$ designating the removal when the wire center is at the position of $O_D$, and $L_4$ designating the removal when the wire center is at the position of $O_4$. The parameter r indicates a distance from the center point of an arc locus to a machined surface (indicated by a dotted line in the drawing) at the corner, and r' denotes the arc radius of a wire center locus at the corner.

In the drawing, while the removal in straight cutting up to the wire electrode center position of $O_1$ (interval A) is $L_1$, the removal at the corner inlet (interval B) increases abruptly from $L_1$ to $L_2$, and the corner is cut with the removal remaining increased (interval C). The removal at the corner outlet (interval D) reduces abruptly from $L_3$ to $L_4$, returning to the removal at the straight cutting (interval E). FIG. 7b shows an example of typical changes in removal amount (microns) in the finishing of an inside corner.

Conversely, in the finishing of an outside corner, the removal amount decreases, as shown in the example of FIG. 7c.

The conventional electrical discharge machine arranged as described above was often unable to respond in velocity to abrupt changes in removal in the finishing of a corner, whereby the machining gap changed at the corner, producing shape errors.

FIG. 8 shows a further difficulty involving the machining tracks for inside corner finishing in the conventional example. In the finishing of an inside corner, the inside corner is machined by changing a corner radius in a plurality of successive machining passes (1st to 4th cuts in the drawing) so that a machined shape has a desired radius R after the final machining pass (4th cut in the drawing). Namely, the inside corner is machined on the track to cause the corner radius in each machining pass to be a value obtained by subtracting an offset value in each machining pass from a programmed radius R (final desired radius) as indicated below:

$$Rn = R - Hn$$

where Rn: corner track radius in the "n"th machining
R: programmed radius
Hn: offset value in the "n"th machining.

In the conventional electrical discharge machine arranged as described above, and as disclosed in Japanese Laid-Open Patent Publication No. SHO63-105837, it was necessary to increase a corner radius gradually as the machining processes changed from roughing-in to final finishing. In this manner, the desired corner radius finally was achieved. However, in practice, there was a limit of approximately 0.2 mm to the minimum radius of an inside corner which could be finished by a wire electrode of, e.g., 0.2 mm diameter.

In view of the above difficulties in machining corners with wire cut machines, the present invention is directed to several objects.

It is, accordingly, one object of the present invention to overcome the disadvantages in the conventional design by providing an electrical discharge machine which exercises non-linear velocity control at a corner to adapt to removal changes at the corner instantly, thereby improving finishing accuracy at the corner.

It is a further object of the present invention to overcome the disadvantages in the conventional art by providing a wirecut electrical discharge machining method and a machine therefor which reduces a machinable inside corner radius sharply and can improve machining accuracy in inside corner finishing.

SUMMARY OF THE INVENTION

The wire electrical discharge machine concerned with the present invention uses a velocity control device for exercising control so that a command velocity does not exceed a set velocity value.

A wire electrical discharge machine concerned with the present invention uses a detected machining gap voltage to calculate an integral command velocity component and uses a programmed arc radius and an electrode offset value in the finishing of an arc to calculate a set velocity value, and defines the set velocity value as a command velocity if the command velocity has exceeded the set velocity value.

In connection with the present invention, a difference between or a ratio of a detected machining gap voltage and a preset reference voltage per predetermined sampling time is used to calculate an integration command velocity component.

In accordance with the present invention, a transient response component and an integration component are used to calculate a feedrate per sampling, a set velocity value is found as the function of a programmed arc radius and an electrode offset value in the finishing of an arc, and the set velocity value is used as the integration component if the integration component has exceeded the set velocity value, so that the integration component does not exceed the set velocity value.

In particular, the wire electrical discharge machine concerned with the present invention calculates the set velocity value at the corner from the corner arc radius and offset value and exercises control so that the moving velocity does not exceed the set velocity value.

Also, the wire electrical discharge machine concerned with the present invention calculates the set velocity value at the corner from the corner arc radius and offset value and exercises control so that the integration component of the moving velocity does not exceed the set velocity value.

A wirecut electrical discharge machining method concerned with the present invention also is operative to machine an inside corner on a track of the same radius in each of a plurality of machining passes.

Also, a wirecut electrical discharge machine concerned with the present invention calculates a moving track on an inside corner in each of a plurality of machining passes so that circular tracks in the inside corner machining of plural machining passes that are different in offset value will have the same radius.

Also, a wirecut electrical discharge machining method concerned with the present invention machines an inside corner on a track of the same radius in each machining pass and under machining conditions, e.g., electrical machining conditions and feedrate, that are changed in response to changes in the amount of removal from the inside corner.

Further, a wirecut electrical discharge machine concerned with the present invention comprises a process and apparatus for calculating a moving track on an inside corner in each of a plurality of machining passes so that circular tracks in the inside corner machining of machining passes that are different in offset value have the same radius, a process and apparatus for defining the moving track to have the same inside corner radius in each machining pass in accordance with the operation results of the first calculation, a process and apparatus for calculating the change in removal on the inside corner in each machining pass, and a process and apparatus which changes and controls electrical machining conditions, feedrate, etc., on the inside corner in accordance with the results of the second calculation.

BRIEF DESCRIPTION OF THE DRAWINGS

FIG. 1a illustrates the arrangement of a wirecut electrical discharge machine in a first embodiment of the present invention and FIG. 1b illustrates the arrangement of a second embodiment.

DESCRIPTION OF THE PREFERRED EMBODIMENTS

Figure 6A:
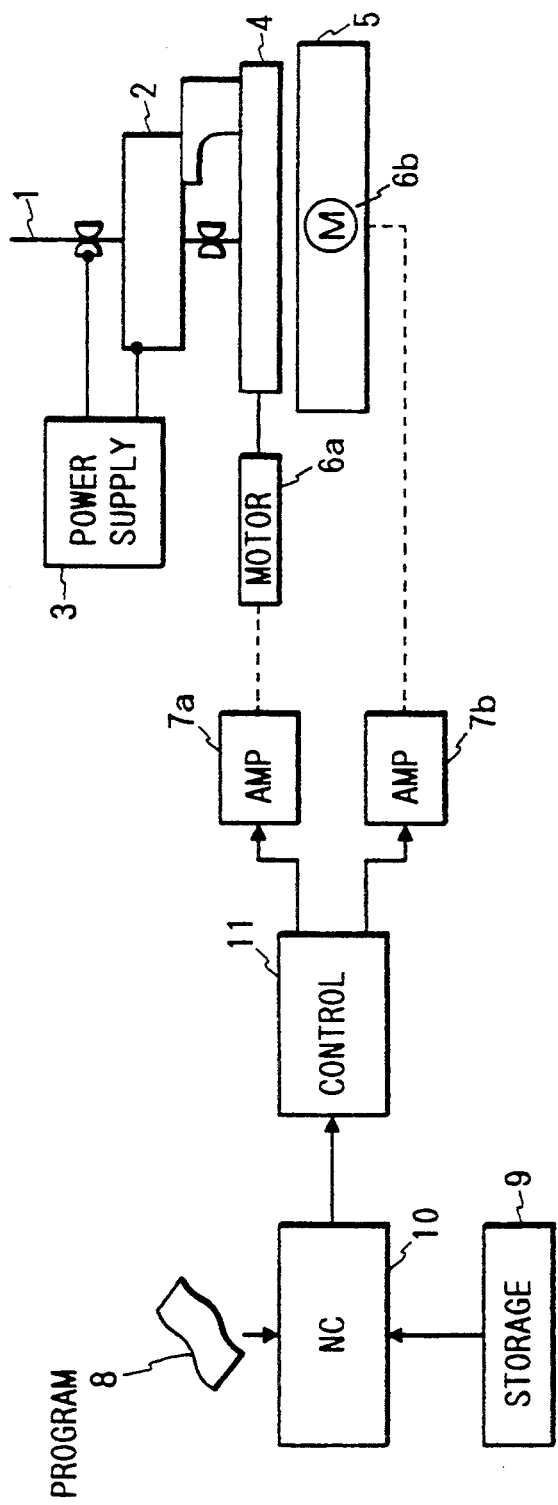
FIG. 6a illustrates the arrangement of a conventional wirecut electrical discharge machine.

The first embodiment of the present invention will now be described in accordance with FIGS. 1a and 2a. In FIG. 1a, the wire electrode 1, workpiece 2, machining power supply 3, X table 4, Y table 5, motors 6a and 6b, servo amplifiers 7a and 7b, NC program 8 and storage device 9 for storing offset data are all seen in the conventional system illustrated in FIG. 6a. Added to the conventional arrangement is a setting switch 21 which is used to select between a standard machining mode and an identical radius machining mode for inside corner machining. Also, within the NC unit 10' is an arithmetic unit 20 that is used to calculate a moving track on an inside corner for each machining pass on the basis of the NC program and the offset data so that circular tracks in the inside corner machining of the machining processes different in offset value have the same radius when the setting switch 21 has been set to the identical radius mode. The control apparatus 11 serves to control track movements to make the inside corner radius in each machining pass equal in accordance with the machining tracks calculated by the arithmetic unit 20.

In operation, as in the conventional example, the wire electrode 1 is run by the wire electrode running device (not shown) and a pulse current is supplied between the wire electrode 1 and the workpiece 2 by the machining power supply 3 to machine the workpiece 2. The arithmetic unit 20 calculates the machining tracks on the basis of the NC program and the offset data given beforehand by memory or an NC tape. If the setting switch 21 has been set to the identical radius mode, the arithmetic unit 20 calculates a moving track on the inside corner in each machining process so that circular tracks in the inside corner machining of the machining processes different in offset value result in the same radius. According to the calculation results of the machining tracks, the control apparatus 11 outputs move commands to the X and Y moving servo amplifiers 7a, 7b to drive the motors 6a, 6b, whereby the wire electrode 1 and the workpiece 2 are moved relatively on a two-dimensional basis to machine the workpiece 2.

Figure 2A:
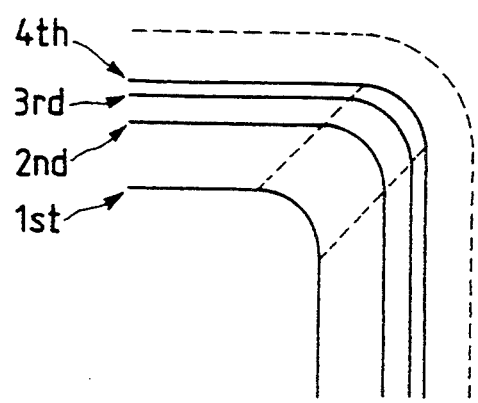
FIG. 2a illustrates the machining tracks of inside corner finishing in the first embodiment of the present invention and FIG. 2b illustrates the changes of removal in inside corner machining to describe the operation in the second embodiment of the present invention.

FIG. 2a shows the machining tracks of inside corner finishing in the first embodiment. In the finishing of the inside corner, the inside corner is machined so that a corner radius in the plural machining passes (1st to 4th cuts in the drawing), proceeding from roughing to the final machining pass (4th cut in the drawing), is uniform.

Figure 7A:
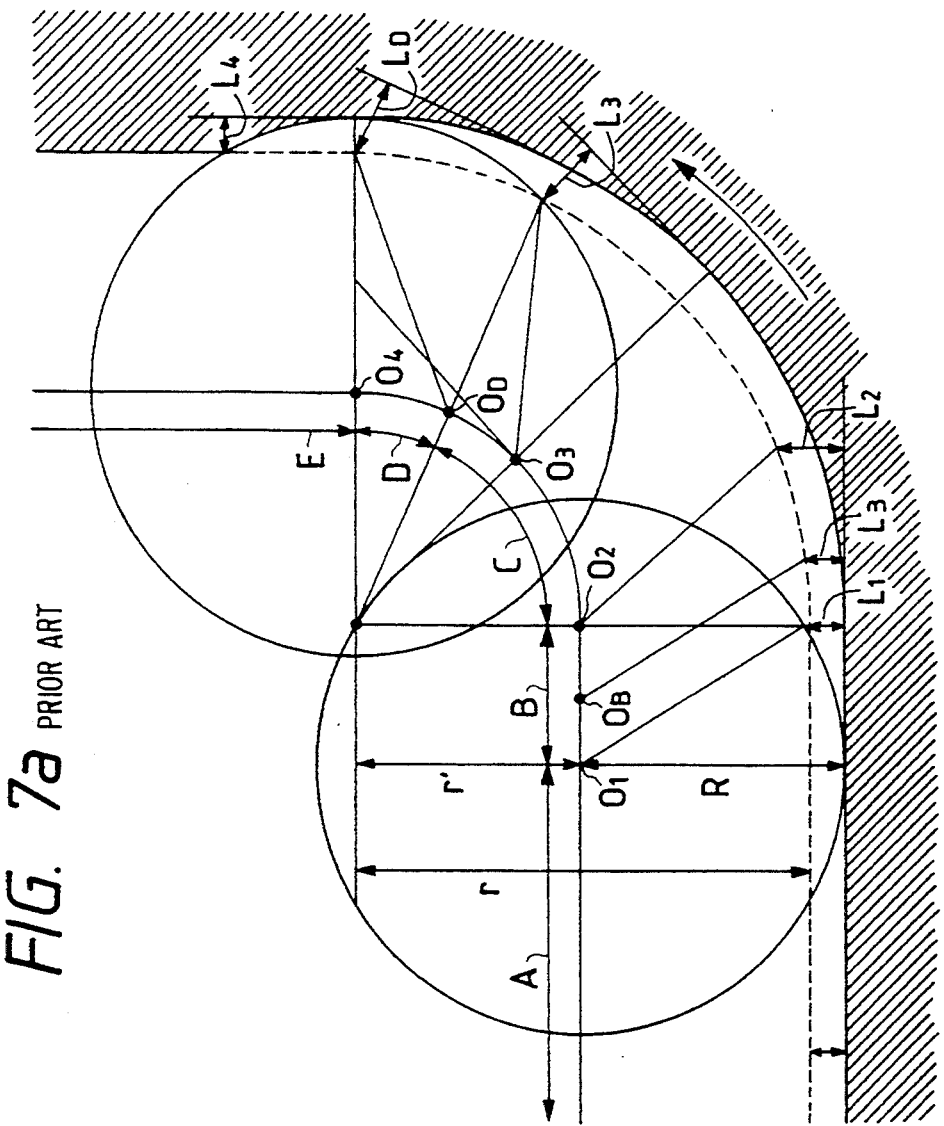
FIG. 7a is a diagram illustrating removal changes in inside corner finishing.
Figure 7B:
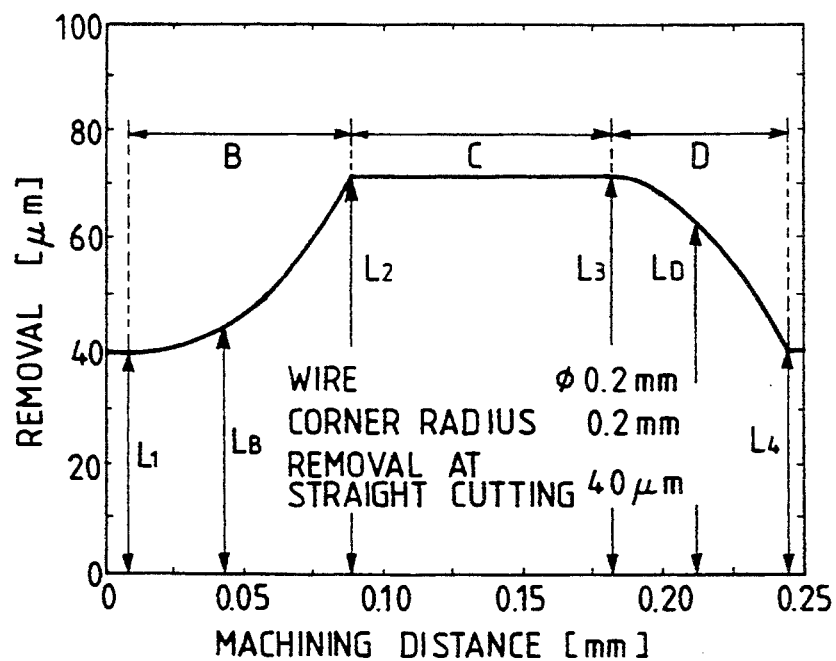
FIG. 7b is a chart illustrating removal changes in inside corner finishing.
Figure 7C:
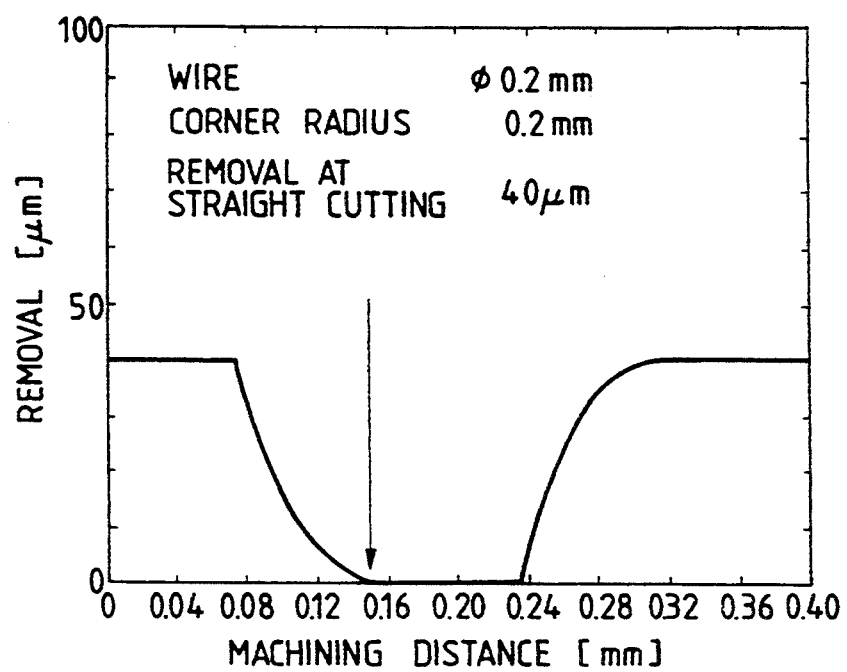
FIG. 7c is a chart illustrating removal changes in outside corner finishing.
Figure 8:
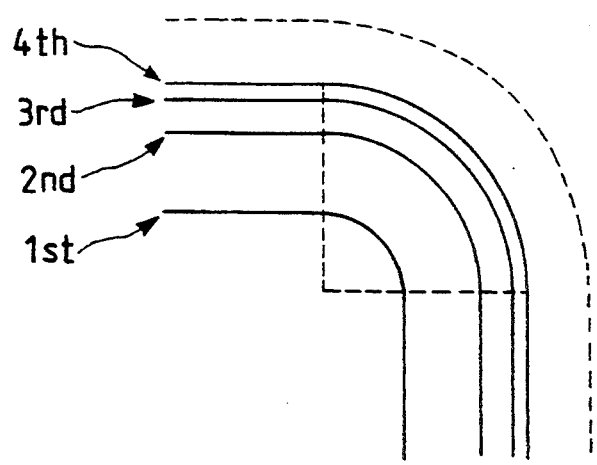
FIG. 8 illustrates the machining tracks of inside corner finishing in the conventional wirecut electrical discharge machine.

Also, if the setting switch 21 has been set to the standard machining mode, the arithmetic unit 20 calculates the machining tracks to change the corner radius in the machining passes (1st to 4th cuts in the drawing) as shown in FIG. 7 for the conventional example, and the workpiece is machined in the standard inside corner machining mode according to the result of such calculation.

While the minimum corner radius of approximately 0.2 mm is provided by a wire of 0.2 mm diameter in an ordinary machining method, the above method will enable a corner to be machined at the minimum corner radius of approximately 0.15 mm using a wire of 0.2 mm diameter in the identical radius machining mode.

A second embodiment of the present invention will now be described in accordance with FIGS. 1b, 2b and 3. FIG. 1b is the same as FIG. 1a except that an arithmetic unit 22 has been added which calculates the change of removal on the inside corner in each machining pass from the machining tracks found by the arithmetic unit 20. Also, a control apparatus 23 is connected at the output of the arithmetic unit 22 to change and control electrical machining conditions on the inside corner according to the increase or decrease in removal on the basis of the calculation result of the arithmetic unit 22.

In operation, as seen in FIG. 1b, the wire electrode 1 is run by the wire electrode running device (not shown) and a pulse current is supplied between the wire electrode 1 and the workpiece 2 by the machining power supply 3 to machine the workpiece 2. The arithmetic unit 20 calculates the machining tracks on the basis of the NC program and the offset data given beforehand by memory or an NC tape. If the setting switch 21 has been set to the identical radius mode, the arithmetic unit 20 calculates a moving track on the inside corner for each machining pass so that circular tracks at the inside corner machining of the several machining passes that are different in offset value result in the same radius as shown in FIG. 2a. According to the calculation results for the machining tracks, the control apparatus 11 outputs move commands to the X and Y moving servo amplifiers 7a, 7b to drive the motors 6a, 6b, whereby the wire electrode 1 and the workpiece 2 are moved relatively on a two-dimensional basis to machine the workpiece 2.

In the meantime, the arithmetic unit 22 calculates the change in removal on the inside corner in each machining pass from the machining tracks found by the arithmetic unit 20. FIGS. 2b and 3 show the changes of removal in the inside corner machining. In these drawings, while the removal is uniform at the value of L0 up to the electrode center position of O0, the removal increases abruptly in a linear movement region (region B in FIG. 3) prior to circular movement in the electrode center position of O0 to O3 and reaches the maximum value at a circular movement starting point O3. Thereafter, the removal decreases suddenly in a circular movement region (region C in FIG. 3) and returns to the linear portion removal of L7 (=L0) at a circular movement end point O7. The ratio of the removal change in the identical radius machining mode is much higher than in the conventional standard corner machining mode as disclosed in Japanese Laid-Open Patent Publication No. SHO63-105837. Hence, ordinary average voltage constant-feed control cannot respond to such sudden removal changes and a short circuit or the like will occur on the inside corner, making machining extremely difficult and deteriorating machining accuracy significantly. In the present embodiment, the changes of removal on the inside corner are calculated and the electrical machining conditions are changed according to the removal changes to machine the workpiece. Namely, since the removal increases abruptly in region B before the inside corner as shown in FIG. 3, discharge frequency is increased to raise an average machining current to increase machining energy. Also, because the removal decreases suddenly in the circular movement region C, the machining energy also will be reduced.

Figure 2B:
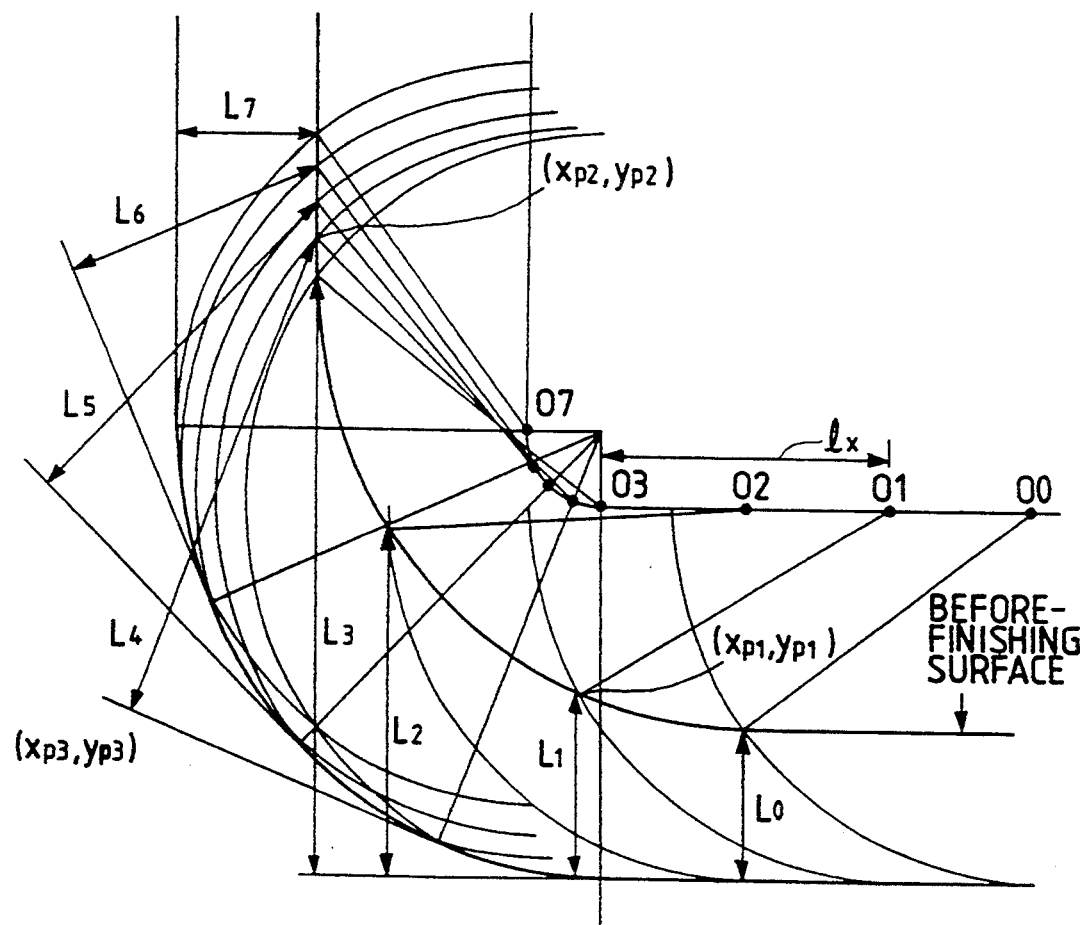
Figure 3:
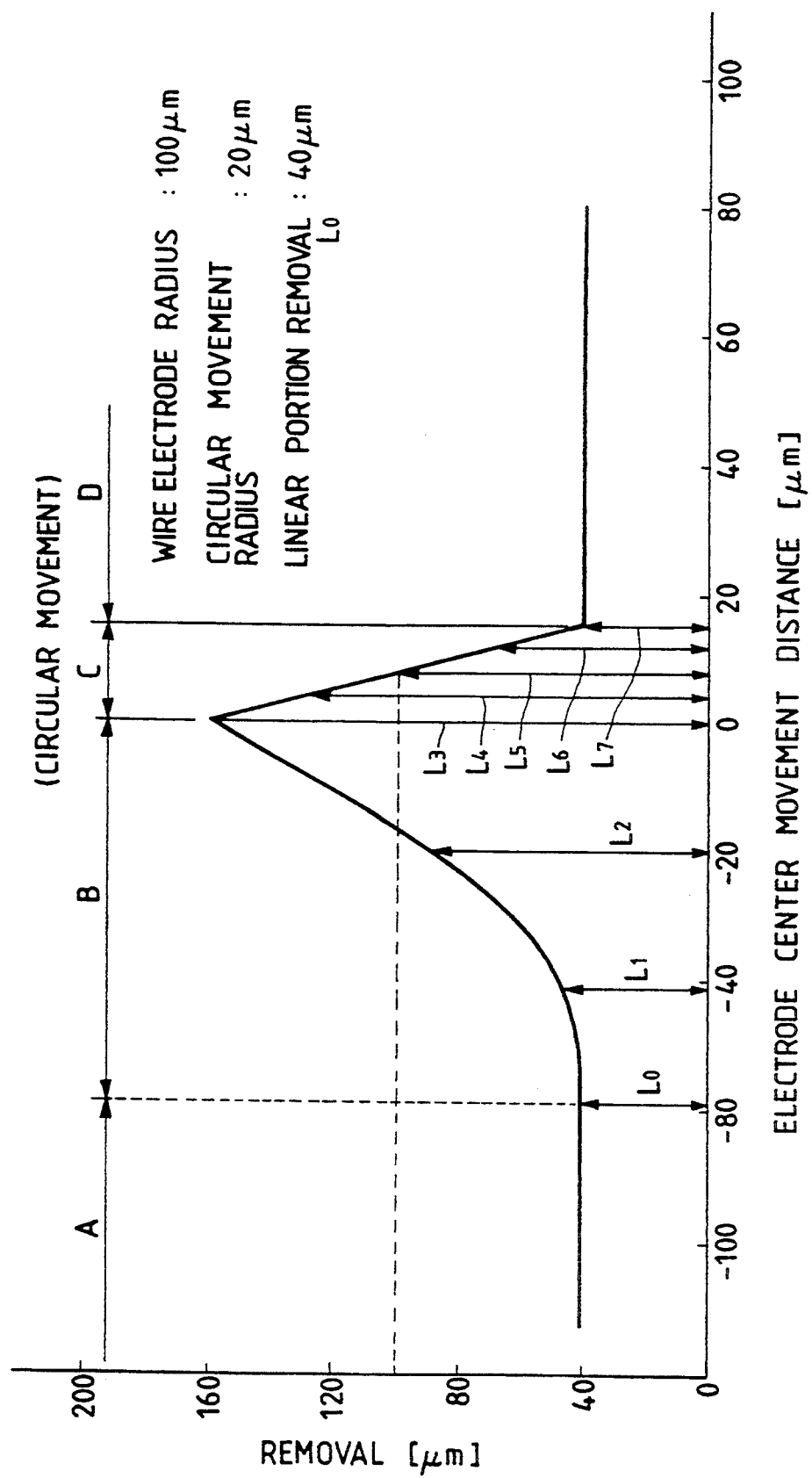
FIG. 3 illustrates the changes of removal in inside corner machining to describe the operation in the second embodiment of the present invention.

In particular, when considering the operation of removing material at a corner as seen in FIG. 2b, the manner of determining the removal amount can be understood as follows.

In FIG. 2b, first consider the removal of material during the linear movement before the corner (electrode center position: 00 to 03). If the center of circular electrode movement is defined as the origin (0, 0):

.Equation of the electrode periphery $$(x-1_x)^2+(y+r)^2=R^2 \quad (1)$$

where r: circular track radius of the wire center
R: wire electrode radius
then the Equation of the pre-finished surface is $$(x-\Delta H)^2+(y-\Delta H)^2=(R+r)^2 \quad (2)$$

where $\Delta H$: electrode shift value (difference between pre-machining track and offset value).

If it is assumed that the coordinates of the intersection point of the above equations (1) and (2) are $(x_{p1}, y_{p1})$, removal L is as follows:

$$L=R+r-Y_{p1} \quad (3)$$

Hence, by calculating the intersection point of equations (1) and (2) and inserting it in equation (3), removal L at the time of linear movement before the corner (region B in FIG. 3) is found.

Now, as to the removal of material in circular movement region at the corner (electrode center position: 03 to 07), a similar equation of the electrode periphery is:

$$(x+r\sin\theta)^2+(y+r\cos\theta)^2=R^2 \quad (4)$$

where $\theta$: angle of the center position on the circular track and the equation of the pre-finished surface is $$x=\Delta H-R-r \quad (5)$$

The coordinates of the intersection point of the above equations (4) and (5) are defined as $(x_{p2}, y_{p2})$.

Now, assuming that the intersection point of a tangent on the electrode periphery and a perpendicular from $(x_{p2}, y_{p2})$ to the tangent is $(x_{p3}, y_{p3})$, removal L is as follows:

$$L=[(x_{p3}-x_{p2})^2+(y_{p3}-y_{p2})^2]^{0.5} \quad (6)$$

Hence, by finding the intersection point of equations (4), (5), finding the intersection point of the perpendicular from the intersection point to the tangent on the electrode periphery and the tangent, and calculating the distance between the two intersection points using equation (6), removal L in circular movement on the corner (region C in FIG. 3) is found.

Whereas the minimum corner radius of approximately 0.2 mm is provided by a wire of 0.2 mm diameter in an ordinary machining method, the above method will enable a corner to be machined at the minimum corner radius of approximately 0.11 mm with a wire of 0.2 mm diameter by machining the corner in the identical corner radius machining mode and by changing and controlling the electrical machining conditions in response to the removal changes. Also, a shape error on the inside corner has been reduced to less than 2 μm.

While the above embodiment was described by way of the example wherein the electrical machining conditions were changed according to the removal on the inside corner, it will be recognized that the other machining conditions, e.g., feedrates and machining tracks, may also be changed to compensate for the after-finishing shape. In other words, control is exercised to reduce the feedrates in the region B before the corner where the removal increases and to increase the feedrate in the circular movement region C where the removal decreases to improve machining accuracy. Also, when the removal increases, an overcut generally tends to occur as described in Japanese Laid-Open Patent Publication No. SHO63-105837. Therefore, by changing the machining tracks to compensate for this overcut, machining accuracy can also be improved.

Figure 4A:
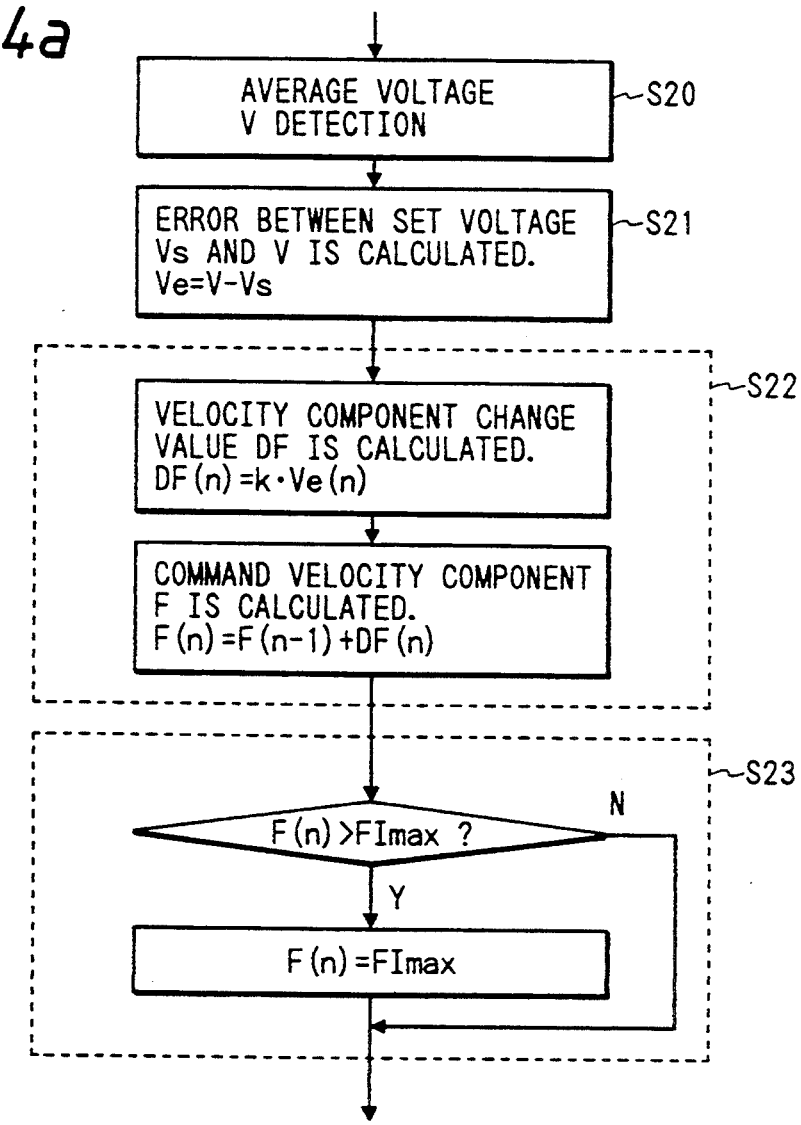
FIG. 4a is a flowchart illustrating a third embodiment of the invention and FIG. 4b is a flowchart illustrating the operation of the arithmetic means of the third embodiment of the invention.

A third embodiment of the invention will now be described in accordance with the appended drawings. FIG. 4a is a flowchart illustrating velocity control in a preferred embodiment of the present invention. The step S21 indicates a step normally performed by an arithmetic unit and involves the calculation of an error between a set voltage and an average machining gap voltage per predetermined sampling time, as detected at step S20. Thereafter, step S22 is performed by the arithmetic unit and involves calculating an integral command velocity from the error voltage found in step S21. Finally, in step S23, a set velocity value is defined as a velocity command if the velocity command has exceeded the set velocity value in the finishing of an arc.

Figure 4B:
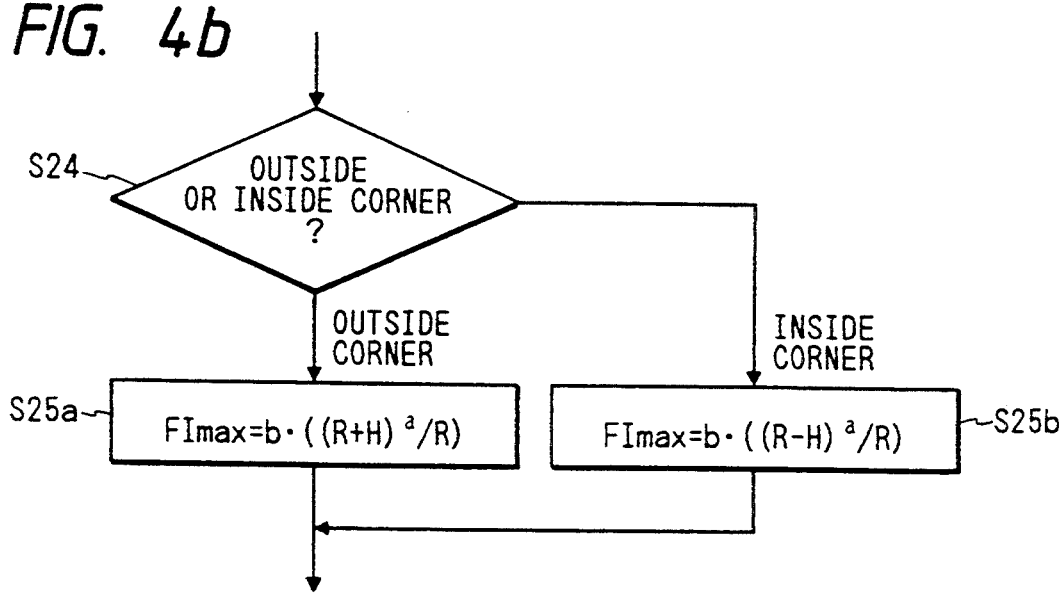

FIG. 4b illustrates a set velocity value calculation flowchart used in corner finishing, wherein step S24 denotes a step of judging whether a corner to be cut is an outside corner or an inside corner, and steps S25a and S25b indicate the calculation of set velocity values at the outside and inside corners, respectively.

Operation will now be described with reference to FIGS. 1, 4a, 4b and 6b. As in the conventional design of FIG. 6b, machining current is supplied by the machining power supply 3 across the wire electrode 1 and the workpiece 2, between which a discharge is generated to permit the progress of machining. First, the average voltage is detected by detector 12 in step S20 and provided to the numerical control unit 10. There, in step S21, arithmetic unit 20 calculates a difference between a set voltage Vs which has already been preset and the average machining gap voltage V detected by the machining gap detection circuit 12 (hereinafter referred to as the error voltage Ve). In this case, error voltage Ve may be represented by the ratio of set voltage Vs to average machining gap voltage V. Then, in step S22 the arithmetic unit 20 calculates a velocity component change value DF(n), defined as the function of error voltage Ve, which is the product of, for example, conversion parameter K for converting a voltage value into a velocity value and the error voltage, and also calculates updated command velocity F(n) obtained by adding the velocity component change value DF(n) to a previously calculated value F(n−1).

In the meantime, as shown in FIG. 4b, the control unit 21 of NC unit 10' in step S24 judges whether a corner is an outside corner or an inside corner. For example, whether a corner is an outside or an inside corner can be determined by the combination of an arc command code (e.g., a clockwise arc is command G02 and a counterclockwise arc is command G03) and an offset command code (leftward offset G41, rightward offset G42 relative to an advance direction) in the NC program 8. A set velocity value FImax at a corner is calculated by the arithmetic unit in step S25a for an outside corner and in step S25b for an inside corner. In the arithmetic unit processing of steps S25a and S25b, set velocity value FImax is defined as the function of programmed arc radius R and electrode offset H and appropriate set velocity values are calculated according to the magnitude of corner R and offset H. For example, they may be represented by the following calculation expressions:

$$Outside\ corner:\ FImax = b((R+H)/R)^a \quad (7)$$

$$Inside\ corner:\ FImax = b((R-H)/R)^a \quad (8)$$

where a and b are values determined by the plate thickness, etc. of the workpiece 2. As described above, a low set velocity value is set for the inside corner and a high set velocity value is set for the outside corner.

Returning to FIG. 4a, the arithmetic unit in step S23 then compares the set velocity value FImax and command velocity F(n). If command velocity F(n) has exceeded the set velocity value in the finishing of an arc, arithmetic operation is performed to define the set velocity value as a velocity command and this result is used as the final command velocity. This command velocity signal is transmitted to the servo amplifier 7 to drive the servo motor 6, whereby the table 4 and the workpiece 2 are moved at desired command velocity.

Such arithmetic operations are repeated per predetermined sampling time, the moving velocity of the workpiece is controlled so as to change according to the state of the machining gap, and the machining advances.

Figure 5:
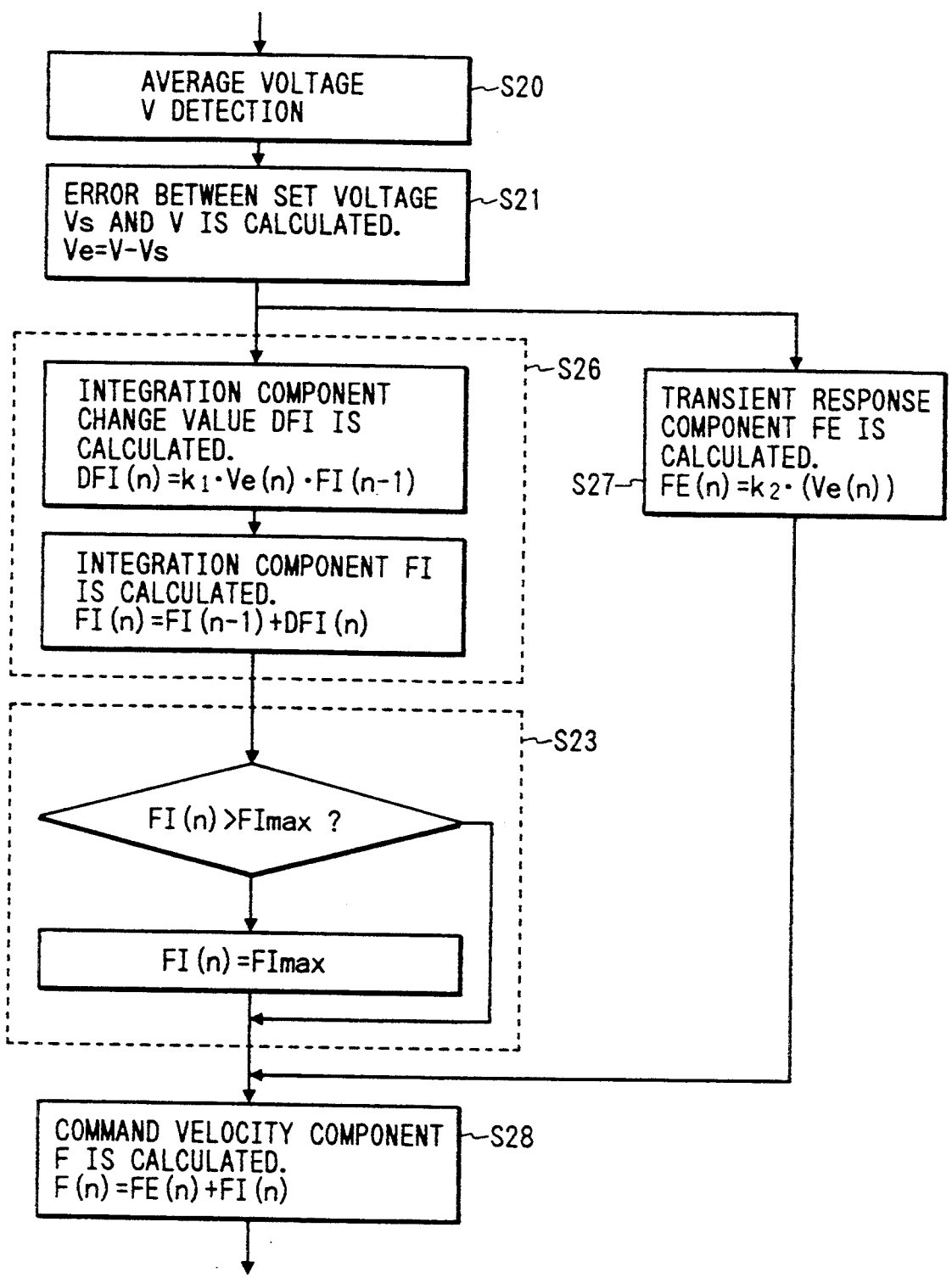
FIG. 5 is a flowchart illustrating a fourth embodiment of the invention.

Another embodiment of the invention will now be described in accordance with reference to FIG. 5, which is a flowchart illustrating the operation of the present invention. Following the detection of an average voltage V, as discussed earlier with respect to step S20, the arithmetic unit 20 calculates an error between a set voltage and an average machining gap voltage per predetermined sampling time in step S21. Thereafter, the arithmetic unit 20 calculates an integral command velocity component in step S26 by adding a velocity change value obtained in consideration of velocity information in previous sampling to a previously calculated value (hereinafter referred to as the integration component). Concurrently, in step S27, the arithmetic unit 20 will calculate a transient command velocity component per sampling (hereinafter referred to as the transient response component) from the calculation result of such error voltage found by the arithmetic unit 20 in step S21. In step S23, the arithmetic unit 21 defines a set velocity value as the integration component if the integration component has exceeded the set velocity value at an arc.

Finally, at step S28, the arithmetic unit calculates a feedrate per sampling from the sum total of the transient response component and the integration component.

Figure 6B:
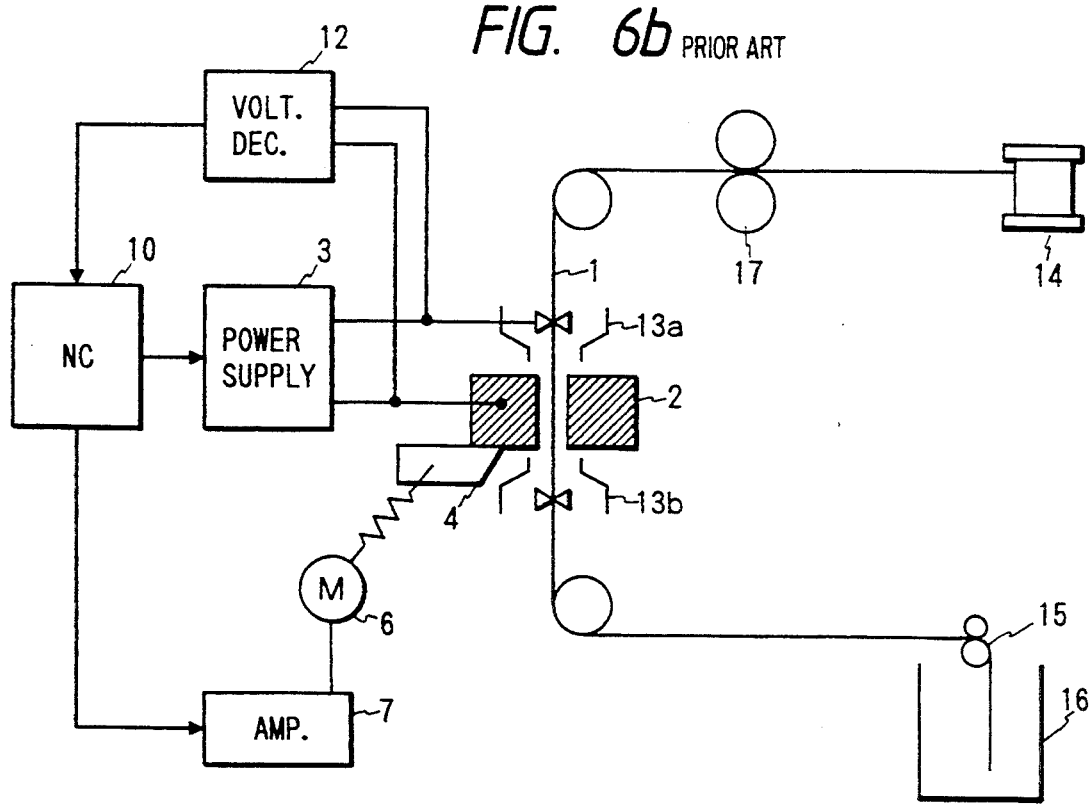
FIG. 6b is yet another illustration of a wire electrical discharge machine known in the art.
Figure 6C:
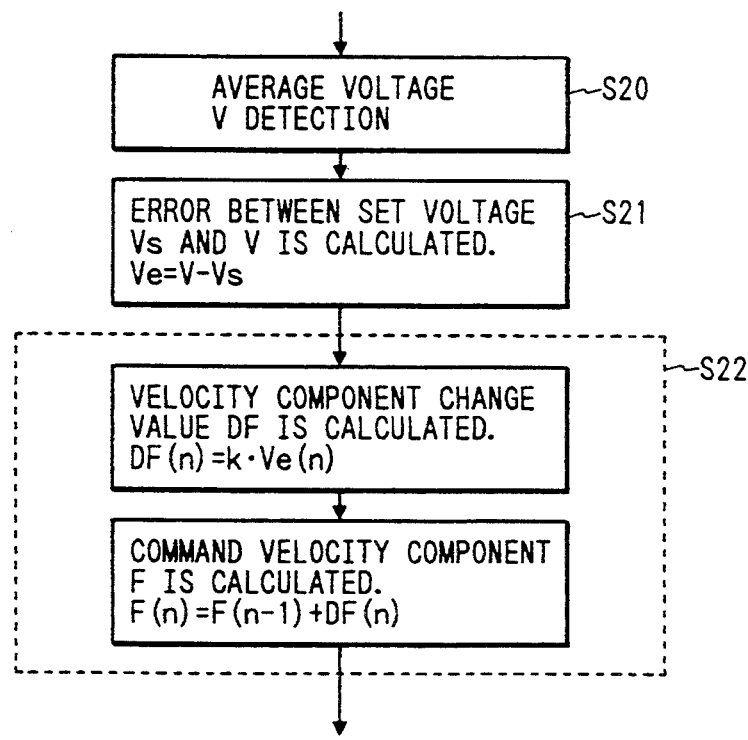
FIG. 6c is a flowchart illustrating the velocity control of the wire electrical discharge machine known in the art.

In operation, as in the conventional process of FIGS. 6b and 6c, machining current is supplied by the machining power supply 3 across the wire electrode 1 and the workpiece 2, between which a discharge is generated to progress machining. As seen in FIG. 5, in step S21, the arithmetic unit 20 calculates a difference between a set voltage Vs, which has already been preset, and an average machining gap voltage V detected by the machining gap detection circuit 5 (hereinafter referred to as the error voltage). In step S26, the arithmetic unit 21 calculates an integration component change value DFI(n) which has been defined as the function of said error voltage Ve and a previous velocity component. For example, integration component change value DFI(n) is represented by the following expression:

$$DFI(n) = K1\ Ve(n)FI(n-1) \quad (9)$$

where K1 is a conversion parameter for converting a voltage value into a velocity value. Subsequently, an updated command velocity F(n) is calculated by adding the integration component change value DFI(n) to a previously calculated value FI(n−1). Concurrently with the calculation of the integration component, the arithmetic unit 20 executes step S27 and calculates a transient response component FE per sampling from the calculation result of the error voltage found by the arithmetic unit in step S21. For example, the transient response component is represented by the following expression:

$$FE(n) = K2\ Ve(n) \quad (10)$$

where K2 is a conversion parameter for converting a voltage value into a velocity value.

As in the third embodiment which uses the routine shown in FIG. 4b, there may be a judging step S24 wherein the NC unit judges whether a corner is an outside corner or an inside corner. A set velocity value FImax at a corner is calculated by the arithmetic unit at step S25a for an outside corner at step S25b for an inside corner. In the arithmetic unit at steps S25a and S25b, a set velocity value FImax is defined as the function of programmed arc radius R and electrode offset H, and appropriate set velocity values are calculated according to the magnitude of corner R and offset H. Also, a low set velocity value is set for the inside corner and a high set velocity value is set for the outside corner. The arithmetic unit 20 in step S23 of FIG. 5 compares the set velocity value FImax and command velocity F(n). If command velocity F(n) has exceeded the set velocity value in the finishing of an arc, an arithmetic operation is performed to define the set velocity value as the integration component. Finally, the arithmetic unit in step S28 calculates the sum total of the integration components found in step S26 and the transient response component calculated in step S27, and this result is employed as the final command velocity.

As in the conventional design, with reference to FIG. 6b, this command velocity signal is transmitted to the servo amplifier 7 to drive the servo motor 6, whereby the table 4 and the workpiece 2 are moved at a desired command velocity. Such arithmetic operations are repeated per predetermined sampling time, the moving velocity of the workpiece is controlled so as to change according to the state of the machining gap, and the machining advances.

It will be apparent that the present invention, as described above, is designed to machine an inside corner on a machining track of the same radius in each machining process, whereby a minimum machinable corner radius can be reduced extremely as compared to the conventional art.

It will also be apparent that the present invention is designed to machine an inside corner on a machining track of the same radius in each machining process and to machine the same under machining conditions, e.g., electrical machining conditions and feedrates, changed according to the changes in removal on the inside corner, whereby a minimum machinable inside corner radius can be reduced extremely and a fine inside corner shape can also be improved significantly in machining accuracy.

It will be apparent that the present invention, as described above, also achieves a wire electrical discharge machine which finds a set velocity value in response to a corner arc radius and an electrode offset at a corner and controls command velocity to be the set velocity value instantly at an inside corner, whereby an undercut in inside corner finishing can be prevented. Also, at an outside corner, the set velocity value is increased to prevent an overcut. Since the above control is exercised automatically for all corners, finishing accuracy at corners is remarkably improved.

It will also be apparent that the present invention achieves a wire electrical discharge machine which controls an integration component to be a set velocity value instantly at a corner. In addition, since a transient response component is considered for the integration component, the machine is adaptive to subtle removal changes in corner cutting, further improving corner shape accuracy. Further, if an abrupt machining area (removal) change occurs when, for example, a wire is bitten by a workpiece end face, the machine can cut the workpiece extremely stably.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. In a wirecut electrical discharge machining method for relatively moving a wire electrode and a workpiece opposed to each other along a programmed track and concurrently applying a voltage between the wire electrode and the workpiece during a first plurality of passes in order to machine the workpiece, the improvement comprising, machining an inside corner in said workpiece while moving on a first track having the same radius at said inside corner as the radius at said inside corner for at least one of a plurality of second tracks, each second track corresponding to a respective one of said machining passes.

2. The wirecut electrical discharge machining method as defined in claim 1, wherein said first and said at least one of a plurality of second tracks comprise circular track portions and are defined by different offset values and wherein said method improvement further comprises calculating said circular track portions so that they have the same radius value notwithstanding differences in offset values.

3. The wirecut electrical discharge machining method as defined in claim 1, wherein said method improvement further comprises calculating the change in workpiece removal amount at said inside corner for each of said first and second tracks and controlling machining conditions on said inside corner in accordance with said calculated workpiece removal results.

4. A wirecut electrical discharge machining method comprising:
relatively moving a wire electrode and a workpiece opposed to each other along a plurality of programmed tracks defining at least one inside corner in said workpiece;
applying a voltage between said wire electrode and said workpiece during a first plurality of passes in order to machine said workpiece under specified machining conditions;
machining said inside corner on the basis of a first track having a first radius at said inside corner; and
machining said inside corner on the basis of at least a second track also having said first radius at said inside corner.

5. The wirecut electrical discharge machining method as defined in claim 4, further comprising:
changing at least one of said specified machining conditions in relation to changes in removal of material at said inside corner.

6. The wirecut electrical discharge machining method as defined in claim 5, wherein:
said changed machining condition comprises at least one of electrical and feedrate parameters.

7. The wirecut electrical discharge machining method as defined in claim 4, further comprising:
machining a plurality of tracks, each having said first radius at said inside corner.

8. A wirecut electrical discharge machine for relatively moving a wire electrode and a workpiece opposed to each other along a plurality of machining tracks, comprising a circular track portion for defining an inside corner, and applying a voltage between the wire electrode and the workpiece to machine the workpiece during a plurality of machining passes along a corresponding machining track, comprising:

means for calculating a first machining track having a first offset value for its circular track portion for machining during a first machining pass and for calculating a second machining track having a second offset value for its circular track portion during a second machining pass, said first offset value being different from said second offset value; and a control apparatus responsive to said calculating means for defining said first and second circular track portions to have the same inside corner radius.

9. A wirecut electrical discharge machine as set forth in claim 8, further comprising means for calculating changes in removal amounts at said inside corner for said first and second tracks; and wherein said control means is operative to change the machining conditions of said apparatus when machining said inside corner.

10. A wirecut electrical discharge machine for relatively moving a wire electrode and a workpiece opposed to each other with the application of a voltage between the wire electrode and the workpiece to machine the workpiece, comprising:

first arithmetic means for calculating a moving track on an inside corner in each of plural machining passes so that circular tracks in the inside corner machining of machining passes different in offset value have the same radius;

first control means for defining the moving track to have the same inside corner radius in each machining pass in accordance with the operation results of said first arithmetic means;

second arithmetic means for calculating the change in removal on the inside corner in each machining pass; and second control means for changing and controlling machining conditions on the inside corner in accordance with the operation results of said second arithmetic means.

11. A wirecut electrical discharge machine as set forth in claim 10, further comprising means for determining whether an arc being machined is an outside corner or an inside corner depending on an arc command type and an offset direction and means responsive to said determining means for specifying one of a first and a second method of calculating said set velocity value.

12. The wire electrical discharge machine of claim 11 wherein it is determined whether an arc being machined is an outside corner or an inside corner depending on an arc command type and an offset direction and means responsive to said determining means for specifying one of a first and a second method of calculating said set velocity value.

13. A wirecut electrical discharge machine as set forth in claim 12, wherein said error voltage is calculated on the basis of one of the difference between or a ratio of the detected gap voltage and the reference voltage.

14. A wirecut electrical discharge machine for relatively moving a wire electrode and a workpiece opposed to each other with the application of a voltage to a gap formed between the wire electrode and the workpiece to machine the workpiece, comprising:

means for detecting the machining gap voltage during machining;

means for calculating an error voltage on the basis of said detected machining gap voltage and a reference voltage per predetermined sampling time;

means for calculating a velocity change value as a function of said error voltage;

means for calculating a command velocity component as a function of said velocity change value and a previously calculated value;

means for calculating a set velocity value as a function of a programmed arc radius and an electrode offset value in the finishing of an arc;

means for defining said set velocity value as a command velocity if said command velocity has exceeded said set velocity value; and a velocity control device for exercising control so that said command velocity does not exceed said set velocity value.

15. A wirecut electrical discharge machine as set forth in claim 11, wherein said error voltage is based on a difference between said machining gap voltage and said reference voltage.

16. A wirecut electrical discharge machine as set forth in claim 11, wherein said error voltage is based on a ratio of said machining gap voltage and said reference voltage.

17. A wirecut electrical discharge machine for relatively moving a wire electrode and a workpiece opposed to each other with the application of a voltage to a gap formed between the wire electrode and the workpiece to machine the workpiece, comprising:

means for detecting the machining gap voltage during machining;

means for calculating an error voltage on the basis of said detected machining gap voltage and a reference voltage per predetermined sampling time;

means for calculating a transient command velocity component on the basis of said error voltage;

means for calculating an integration command velocity component on the basis of a said error voltage and a previously calculated value;

means for calculating a set velocity value as a function of a programmed arc radius and an electrode offset value in the finishing of an arc;

means for defining said set velocity value as the integration component if said integration component has exceeded said set velocity value;

velocity control means for exercising control so that said integration component does not exceed said set velocity value; and means for calculating a feedrate per sampling from the sum total of said transient command velocity component and said integration command velocity component.

18. A wirecut electrical discharge machining method for relatively moving a wire electrode and a workpiece opposed to each other along a programmed track and concurrently applying a voltage between the wire electrode and the workpiece in order to machine the workpiece, comprising:

detecting the machining gap voltage during machining;

calculating an error voltage on the basis of said detected machining gap voltage and a reference voltage per predetermined sampling time;

calculating a velocity change value as a function of said error voltage;

calculating a command velocity component as a function of said velocity change value and a previously calculated value;

calculating a set velocity value as a function of a programmed arc radius and an electrode offset value in the finishing of an arc;

defining said set velocity value as a command velocity if said command velocity has exceeded said set velocity value; and controlling velocity so that said command velocity does not exceed said set velocity value.

19. The wire electrical discharge method of claim 17, further comprising, determining whether an arc being machined is an outside corner or an inside corner depending on an arc command type and an offset direction, and changing the calculation method of said set velocity value depending on the result of said determining step.

20. A wirecut electrical discharge machining method for relatively moving a wire electrode and a workpiece opposed to each other along a programmed track and concurrently applying a voltage between the wire electrode and the workpiece in order to machine the workpiece, comprising:

detecting the machining gap voltage during machining;

calculating an error voltage on the basis of said detected machining gap voltage and a reference voltage per predetermined sampling time;

calculating a transient command velocity component on the basis of said error voltage;

calculating an integration command velocity component on the basis of said error voltage and a previously calculated value;

calculating a set velocity value as a function of a programmed arc radius and an electrode offset value in the finishing of an arc;

defining said set velocity value as the integration component if said integration component has exceeded said set velocity value;

controlling velocity so that said integration component does not exceed said set velocity value; and calculating a feedrate per sampling from the sum total of said transient command velocity component and said integral command velocity component.

21. The wire electrical discharge method of claim 20, further comprising, determining whether an arc being machined is an outside corner or an inside corner depending on an arc command type and an offset direction, and changing the calculation method of said set velocity value depending on the result of said determining step.

* * * * *